United States Patent
Ulbrich

(10) Patent No.: US 10,135,798 B2
(45) Date of Patent: Nov. 20, 2018

(54) SYSTEMS AND METHODS FOR IMPLEMENTING A PROXIMITY LOCK USING BLUETOOTH LOW ENERGY

(71) Applicant: JPMorgan Chase Bank, N.A., New York, NY (US)

(72) Inventor: Steven J. Ulbrich, Downers Grove, IL (US)

(73) Assignee: JPMorgan Chase Bank, N.A., New York, NY (US)

(*) Notice: Subject to any disclaimer, the term of this patent is extended or adjusted under 35 U.S.C. 154(b) by 0 days.

(21) Appl. No.: 15/631,178

(22) Filed: Jun. 23, 2017

(65) Prior Publication Data
US 2017/0374045 A1    Dec. 28, 2017

Related U.S. Application Data

(60) Provisional application No. 62/353,848, filed on Jun. 23, 2016.

(51) Int. Cl.
| | |
|---|---|
| *H04B 17/318* | (2015.01) |
| *H04L 29/06* | (2006.01) |
| *H04W 4/80* | (2018.01) |
| *G06F 21/62* | (2013.01) |
| *H04W 12/02* | (2009.01) |

(52) U.S. Cl.
CPC .......... *H04L 63/0492* (2013.01); *G06F 21/62* (2013.01); *H04W 4/80* (2018.02); *H04W 12/02* (2013.01); *G06F 2221/2111* (2013.01)

(58) Field of Classification Search
CPC ... H04W 4/80; H04W 4/008; H04W 52/0245; H04W 52/245; H04B 17/318; H04L 63/0492; G06F 21/62
See application file for complete search history.

(56) References Cited

U.S. PATENT DOCUMENTS

| | | | |
|---|---|---|---|
| 5,821,854 A | * | 10/1998 | Dorinski ................. G06F 21/35 340/539.21 |
| 8,751,391 B2 | | 6/2014 | Freund |
| 2003/0034877 A1 | | 2/2003 | Miller et al. |

(Continued)

OTHER PUBLICATIONS

International Search Report and Written Opinion, International Application No. PCT/US17/38952, dated Oct. 3, 2017, pp. 1-11.

*Primary Examiner* — Andrew Wendell
(74) *Attorney, Agent, or Firm* — Hunton Andrews Kurth LLP

(57) ABSTRACT

Systems and methods for implementing a proximity lock using Bluetooth Low Energy are disclosed. According to one embodiment, a Bluetooth low energy proximity lock system may include a host electronic device comprising a computer processor; a peripheral electronic device interfacing with the host electronic device that may include a controller and a first Bluetooth low energy component; and a user device comprising a second Bluetooth low energy component. The controller may, using the first Bluetooth low energy component, identify the second Bluetooth low energy component, determine a radio signal strength between the first Bluetooth radio component and the second Bluetooth low energy component; and generate a command that renders the host electronic device temporarily inoperable in response to the radio signal strength being below a predetermined threshold.

18 Claims, 2 Drawing Sheets

(56) References Cited

U.S. PATENT DOCUMENTS

| | | |
|---|---|---|
| 2011/0305337 A1 | 12/2011 | Devol et al. |
| 2011/0314539 A1* | 12/2011 | Horton ................... G06F 21/35 |
| | | 726/20 |
| 2012/0030752 A1 | 2/2012 | Bruno et al. |
| 2013/0297844 A1 | 11/2013 | Rosenberg et al. |
| 2014/0059263 A1 | 2/2014 | Rosenberg et al. |
| 2014/0237229 A1 | 8/2014 | Rosenblatt |
| 2014/0307600 A1 | 10/2014 | Dumitrescu et al. |
| 2015/0302188 A1* | 10/2015 | Potbhare ............... H04L 9/3234 |
| | | 713/185 |
| 2015/0347738 A1 | 12/2015 | Ulrich et al. |
| 2016/0246753 A1* | 8/2016 | Tan ..................... G06F 13/4282 |
| 2016/0337863 A1* | 11/2016 | Robinson .............. H04W 12/08 |
| 2017/0289118 A1* | 10/2017 | Khosravi ............... H04L 63/107 |
| 2017/0359339 A1* | 12/2017 | Hevizi ................... H04W 4/80 |
| 2018/0084103 A1* | 3/2018 | Hamilton ............... G08G 1/052 |

\* cited by examiner

SYSTEMS AND METHODS FOR IMPLEMENTING A PROXIMITY LOCK USING BLUETOOTH LOW ENERGY

RELATED APPLICATIONS

This application claims priority to U.S. Provisional Patent Application Ser. No. 62/353,848, filed Jun. 23, 2016, the disclosure of which is hereby incorporated by reference in its entirety.

BACKGROUND OF THE INVENTION

1. Field of the Invention

The present disclosure generally relates to a proximity lock using Bluetooth Low Energy.

2. Description of the Related Art

Bluetooth Low Energy ("BLE") is a technology that has been included in many mobile devices since as early as 2010. BLE may be used to transmit information from one device to another. To receive a transmission from a BLE device, no special equipment is required so long as the device is capable of receiving BLE transmissions.

SUMMARY OF THE INVENTION

Systems and methods for implementing a proximity lock using Bluetooth Low Energy are disclosed. According to one embodiment, a Bluetooth low energy proximity lock system may include a host electronic device comprising a computer processor; a peripheral electronic device interfacing with the host electronic device that may include a controller and a first Bluetooth low energy component; and a user device comprising a second Bluetooth low energy component. The controller may, using the first Bluetooth low energy component, identify the second Bluetooth low energy component, determine a radio signal strength between the first Bluetooth radio component and the second Bluetooth low energy component; and generate a command that renders the host electronic device temporarily inoperable in response to the radio signal strength being below a predetermined threshold.

In one embodiment, the host electronic device may be one of a desktop computer, a workstation, and a notebook computer.

In one embodiment, the peripheral electronic device may be a keyboard.

In one embodiment, the command may be a keyboard command.

In one embodiment, the command may cause the host electronic device to lock the host electronic device.

In one embodiment, the system may further include a display that interfaces with the host electronic device, and the command causes the host electronic device to obscure or blank the display.

In one embodiment, the command may cause the host electronic device to update a status for a user.

In one embodiment, the user device is a badge, a mobile electronic device, etc.

In another embodiment, a method for using a Bluetooth low energy proximity lock may include (1) a controller of a peripheral device comprising a first Bluetooth low energy component that is interfaced with a host electronic device identifying a second Bluetooth low energy component in a user device; (2) the controller determining a radio signal strength between the first Bluetooth radio component and the second Bluetooth low energy component; and (3) the controller generating a command that renders the host electronic device temporarily inoperable in response to the radio signal strength being below a predetermined threshold.

In one embodiment, the host electronic device may be a desktop computer, a workstation, a notebook computer, etc.

In one embodiment, the peripheral electronic device may be a keyboard.

In one embodiment, the command may be a keyboard command.

In one embodiment, the command may cause the host electronic device to lock the host electronic device, to obscure or blank a display that is provided for the host electronic device, to update a status for a user, to release or reallocate resources used by a user instance, reprioritize the user instance, etc.

In one embodiment, the user device may be a badge, a mobile electronic device, etc.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
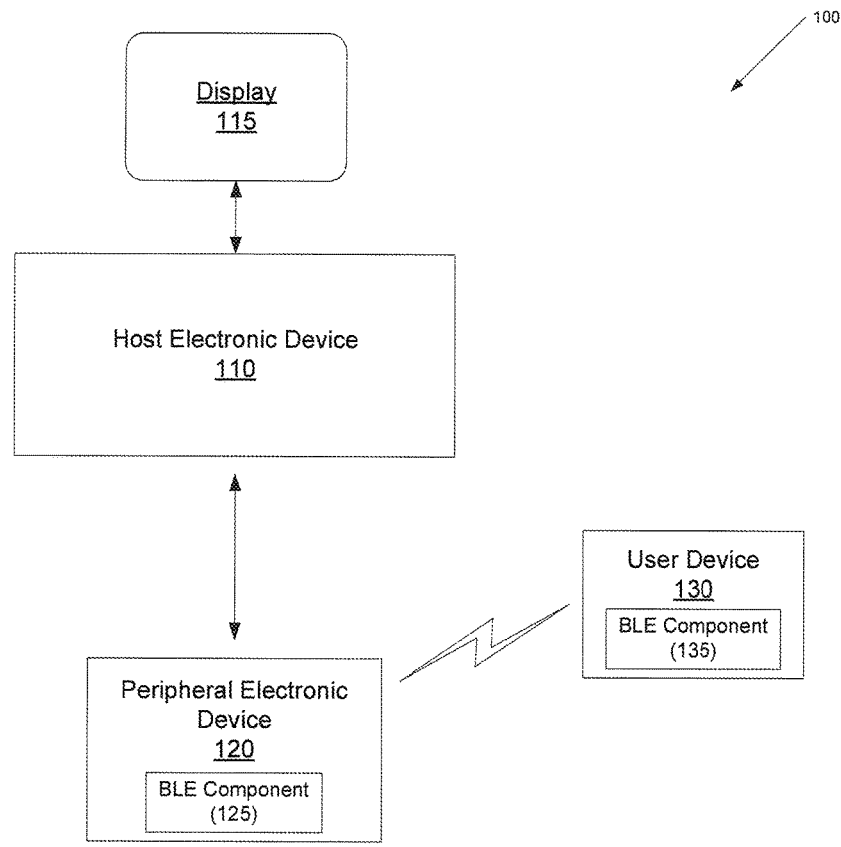
FIG. 1 depicts a system for implementing a proximity lock using Bluetooth Low Energy according to one embodiment.
Figure 2:
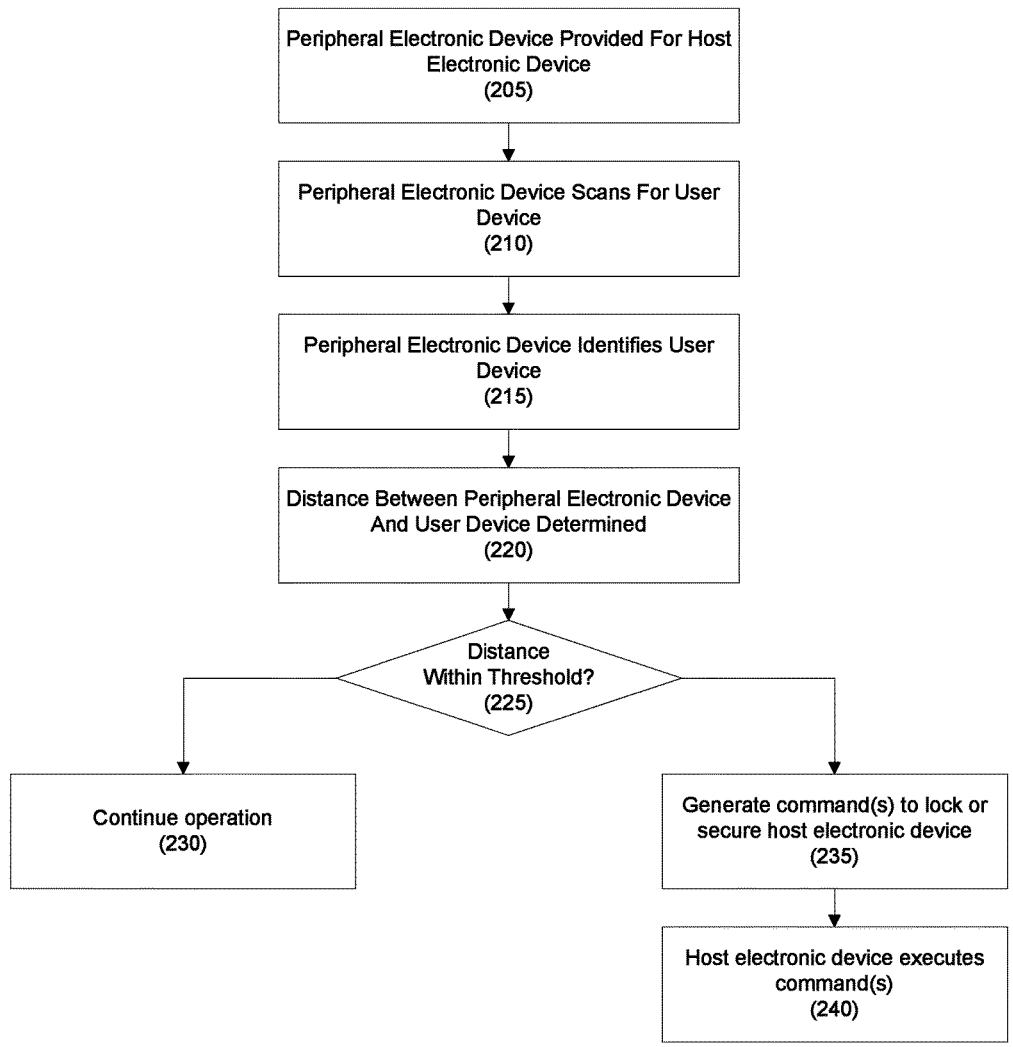
FIG. 2 depicts a method for implementing a proximity lock using Bluetooth Low Energy according to one embodiment.

Various embodiments of the present invention and their advantages may be understood by referring to FIGS. 1-2.

The disclosures of U.S. Pat. No. 8,751,391, and U.S. patent application Ser. Nos. 13/032,952; 13/524,630; and 13/800,505 are hereby incorporated by reference in their entireties.

Embodiments relate to locking, securing, or otherwise rendering temporarily unusable electronic equipment, such as computer workstations, tablet computers, smart phones, displays, or any other suitable electronic device when the user/owner/assigned person is not present, in control, and/or in observation thereof.

In another embodiment, the disclosure may be applied to mobile resources, such as baby strollers (e.g., lock the wheels if the care taker is outside of a certain range), bicycles, etc.

Embodiments disclosed herein are directed to a Bluetooth Low Energy proximity lock that locks or otherwise secures a computer or other electronic device when the user, owner, etc. carrying a user device leaves the vicinity of that device. Alternatively, the BLE proximity lock may lock or otherwise secure an electronic device when an unauthorized user comes within a certain distance of the electronic device.

In one embodiment, the proximity lock may comprise a peripheral electronic device and a user device. The peripheral device may include a programmed microcontroller and a BLE component, and may be programmed to broadcast a BLE signal with Radio Signal Strength Indicator ("RSSI") levels and characteristics.

The peripheral device may comprise a hardware tool that interfaces with the electronic device as a human input device ("HID"), such as a keyboard, mouse, touchpad, touchscreen, etc., or code executed by any the preceding. In another embodiment, the peripheral electronic device may emulate a HID.

The user device may be a portable device that may be generally associated with the location of a person, such as a badge, an electronic device (e.g., smartphone), a wearable device (e.g., smart watch, token), etc. In one embodiment, the user device may be programmed to broadcast a BLE signal with RSSI levels and characteristics.

In one embodiment, the peripheral device and the user device may use BLE to determine close, near, and far distances, or any other suitable measurement to another device, such as a user device (e.g., a BLE-enabled badge or other BLE-enabled electronic device that may be carried on the user's person). For example, the peripheral electronic device may scan for a specific user device to determine the distance between the central unit and the user device. The distance may be derived from the RSSI value.

The peripheral electronic device may be programmed to translate the distance, the RSSI level, and/or any other suitable value into an indicator (e.g., Green, Yellow, and Red), or any other suitable indicator (e.g., 1-10, etc.). For example, one of the states (e.g., the Red state) may cause the peripheral electronic device to send, for example, one or more commands to the host device to blank, obscure, or turn off a display, lock the electronic device, shut down the electronic device, log out of an account, send a notification that the user is not present, update the user's status, etc. In another embodiment, the command(s) may result in better energy and/or computer cycling without suspending or shutting down the incidence (e.g., usage throttling), for example, releasing system resources, moving an instance to a lower priority to allow the host to recover or better allocate resources, etc. The exact command may be specific to the OS type (e.g., Windows, Linux, Apple, etc.).

In one embodiment, the command may be a script, a program, etc.

In one embodiment, when the user device is within a predetermined distance, an action indicating that the user is present, such as sending a notification that the user is present, updating the user's status, etc. may be performed.

Referring to FIG. 1, a system for implementing a proximity lock using Bluetooth Low Energy is disclosed according to one embodiment. System 100 may include host electronic device 110, which may be a workstation, a notebook computer, a tablet computer, a smartphone, an Internet of Things ("IoT") appliance, or any other suitable electronic device. Host electronic device 110 may interface with display 115 and peripheral electronic device 120. Peripheral electronic device 120 may comprise a microprocessor, a microcontroller, or other control element (not shown), and BLE component 125.

In one embodiment, peripheral electronic device 120 may interface with host electronic device 110 using a port (e.g., a USB port), wirelessly (e.g., Bluetooth, IR, RF, etc.), etc. In one embodiment, peripheral electronic device 120 may be recognized by host electronic device 110 as a HID or a similar device, such as a keyboard.

In one embodiment, if not inserted into a port (e.g., a USB port) of host electronic device 110, peripheral electronic device 120 may be located proximate to host electronic device 110.

In one embodiment, a microprocessor or microcontroller (not shown) in peripheral electronic device 120 may comprise instructions to send a keyboard "lock computer" signal, or a similar signal, to host electronic device 110. Other instructions (e.g., lock the screen, shut down the electronic device, log out of an account, black-out the display, etc.) may be used as necessary and/or desired.

User device 130 may be located remotely from peripheral electronic device 120. User device 130 may comprise a microprocessor or microcontroller (not shown) and BLE component 135. In one embodiment, BLE component 135 may broadcast information and may provide any other information in response to a query from peripheral electronic device 120. For example, BLE component 135 may broadcast a unique identifier.

In one embodiment, user device 130 may be incorporated into an identification card, a token, a smart phone, a smart watch, etc. In one embodiment, a smart phone (not shown) may emulate and/or simulate user device 130.

In one embodiment, BLE component 125 in peripheral electronic device 120 may scan for and detect the presence of BLE component 135 in user device 130. Based on a Radio Signal Strength Indicator level, the microcontroller of peripheral electronic device 120 may determine a distance between peripheral electronic device 120 and user device 130. In one embodiment, the distance may be expressed in meters.

In one embodiment, the microcontroller of peripheral electronic device 120 may translate the distance into categories (e.g., red-yellow-green; A-F; far-near-close, 1-10; etc.).

Based on the distance and/or the categorization of the distance, the microcontroller of peripheral electronic device 120 may send one or more instruction (e.g., one or more keyboard commands) to host electronic device 110 to lock the computer (e.g., control-alt-delete, etc.), blank or blur display 115, lock host electronic device 110, shut down host electronic device 110, log out of an account, etc. Any suitable instruction(s) may be provided as necessary and/or desired (e.g., based on operating system, desired effect, etc.).

In one embodiment, if host electronic device 110 is locked and user device 130 is sensed to be within a certain distance, distance category, etc., the microcontroller of peripheral electronic device 120 may send one or more keyboard instructions to host electronic device 110 to unlock host electronic device 110. For example, the microcontroller of peripheral electronic device 120 may be programmed with the user's credentials (e.g., userid and password, etc.) and may provide the credentials to host electronic device 120.

In one embodiment, BLE may be used to identify and/or locate user device 130. For example, using host electronic device 110, the user may issue a command via peripheral electronic device 120 to user device to activate an alarm, turn on a light, vibrate, issue a signal, etc. In another embodiment, the user may be provided with a range (e.g., in meters, near/close/far, a distance scale, etc.) between peripheral electronic device 120 and user device 130.

In one embodiment, if an alarm, light, or other signal is used, the signal may time out after a predetermined of time, after user device 130 is located (e.g., the user indicates that user device 130 was found, when user device 130 is moved, etc.).

Referring to FIG. 2, a method for implementing a proximity lock using Bluetooth Low Energy is disclosed according to one embodiment.

In step 205, a peripheral electronic device may be provided for a host electronic device. As discussed above, a host electronic device may be an electronic device (e.g., computer workstations, tablet computers, smart phones, terminals, IoT devices, displays, etc.) that may be locked, secured, or otherwise rendered temporarily unusable when the user/owner/assigned person is not present, in control, and/or in observation thereof.

In addition, the peripheral electronic device may be an electronic device that interfaces with host electronic device and may issue commands to host electronic device. For example, in one embodiment, the peripheral electronic device may be a HID, such as a keyboard, a mouse, a touch pad, etc. In another embodiment, the peripheral electronic device may emulate a HID.

In one embodiment, the peripheral electronic device may interface with the host electronic device directly by, for example, a USB port. In another embodiment, the peripheral electronic device may communicate wirelessly with the host electronic device by, for example, Bluetooth, IR, RF, etc.

In step 210, the peripheral electronic device may scan for a user device. As discussed above, the user device may be a BLE-enabled badge, token, card, or a mobile electronic device. In addition, a mobile electronic device may emulate a user device.

In one embodiment, the peripheral electronic device may scan for a specific user device by querying each detected user device for a unique identifier.

In step 215, the peripheral electronic device may identify the use device based on, for example, a unique identifier returned by the unique device.

In step 220, the distance between the peripheral electronic device and the user device may be determined. As discussed above, the distance may be derived from the RSSI value.

In one embodiment, the RSSI value may translated into distance, and/or any other suitable value into an indicator (e.g., Green, Yellow, and Red), or any other suitable indicator (e.g., far-near-close, 1-10, etc.). In one embodiment, this may be performed by the peripheral electronic device and/or the host electronic device.

In step 225, a determination may be made whether the RSSI value, the distance, or the indicator is within a threshold value that indicates that the user device is within a certain distance of the host electronic device. If it is, in step 230, the host electronic device may continue to function. In one embodiment, the user's status may be set to indicate that the user is present at the host electronic device.

If it is not, in step 235 the peripheral electronic device may generate a command to lock, secure, or otherwise render host electronic device temporarily unusable. For example, as discussed above, peripheral electronic device may generate one or more command to blank or obscure the display, lock the host electronic device, shut down the host electronic device, log out of an account, etc. The exact command may be specific to the OS type (e.g., Windows, Linux, Apple, etc.).

In step 240, the host electronic device may execute the command, thereby to locking, securing, or otherwise rendering the host electronic device or display temporarily unusable.

In one embodiment, the user's status may also be updated to indicate that the user is not present at the host electronic device.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A Bluetooth low energy proximity lock system, comprising:
   a host electronic device comprising a computer processor;
   a peripheral electronic device comprising a computer keyboard interfacing with the host electronic device and comprising:
      a controller; and
      a first Bluetooth low energy component; and
   a user device comprising a second Bluetooth low energy component;
   wherein the controller:
      using the first Bluetooth low energy component, identifies the second Bluetooth low energy component;
      determines a radio signal strength between the first Bluetooth radio component and the second Bluetooth low energy component; and
      generates a keyboard command that renders the host electronic device temporarily inoperable in response to the radio signal strength being below a predetermined threshold.

2. The system of claim 1, wherein the host electronic device is one of a desktop computer, a workstation, and a notebook computer.

3. The system of claim 1, wherein the keyboard command causes the host electronic device to lock the host electronic device.

4. The system of claim 1, further comprising a display that interfaces with the host electronic device;
   wherein the keyboard command causes the host electronic device to obscure or blank the display.

5. The system of claim 1, wherein the keyboard command causes the host electronic device to update a status for a user.

6. The system of claim 1, wherein the user device is a badge.

7. The system of claim 1, wherein the user device is a mobile electronic device.

8. The system of claim 1, wherein the keyboard command comprises the control-alt-delete command.

9. The method of claim 1, wherein the keyboard command comprises the control-alt-delete command.

10. A method for using a Bluetooth low energy proximity lock, comprising:
    a controller of a computer keyboard comprising a first Bluetooth low energy component that is interfaced with a host electronic device identifying a second Bluetooth low energy component in a user device;
    the controller determining a radio signal strength between the first Bluetooth radio component and the second Bluetooth low energy component; and
    the controller generating a keyboard command that renders the host electronic device temporarily inoperable in response to the radio signal strength being below a predetermined threshold.

11. The method of claim 10, wherein the host electronic device is one of a desktop computer, a workstation, and a notebook computer.

12. The method of claim 10, wherein the keyboard command causes the host electronic device to lock the host electronic device.

13. The method of claim 10, wherein the keyboard command causes the host electronic device to obscure or blank a display that is provided for the host electronic device.

14. The method of claim 10, wherein the keyboard command causes the host electronic device to update a status for a user.

15. The method of claim 10, wherein the keyboard command causes the host electronic device to reallocate resources associated with a user incidence.

16. The method of claim 10, wherein the keyboard command causes the host electronic device to reprioritize a user instance.

17. The method of claim 10, wherein the user device is a badge.

18. The method of claim 10, wherein the user device is a mobile electronic device.

* * * * *